United States Patent [19]

Muraoka

[11] Patent Number: 5,862,221
[45] Date of Patent: Jan. 19, 1999

[54] SCRAMBLE WIRELESS COMMUNICATION SYSTEM

[75] Inventor: Shinya Muraoka, Tokyo, Japan

[73] Assignee: NEC Corporation, Tokyo, Japan

[21] Appl. No.: 883,807

[22] Filed: Jun. 27, 1997

Related U.S. Application Data

[63] Continuation of Ser. No. 438,693, May 11, 1995, abandoned.

[30] Foreign Application Priority Data

May 11, 1994 [JP] Japan ................................ 6-097144

[51] Int. Cl.$^6$ ................................................. H04K 1/00
[52] U.S. Cl. ................................ 380/21; 380/46; 380/49
[58] Field of Search ................................ 380/21, 23, 4, 380/46, 49

[56] References Cited

U.S. PATENT DOCUMENTS

| | | | |
|---|---|---|---|
| 5,325,432 | 6/1994 | Gardeck et al. | 380/21 |
| 5,357,571 | 10/1994 | Banwart | 380/21 |
| 5,381,479 | 1/1995 | Gardeck et al. | 380/21 |
| 5,404,404 | 4/1995 | Novorita | 380/21 |
| 5,442,703 | 8/1995 | Kim et al. | 380/21 |
| 5,528,691 | 6/1996 | Rosauer et al. | 380/21 |
| 5,557,654 | 9/1996 | Maenpaa | 380/21 |
| 5,586,185 | 12/1996 | Shibata et al. | 380/21 |

FOREIGN PATENT DOCUMENTS 4-192638  7/1992  Japan .

*Primary Examiner*—David C. Cain
*Attorney, Agent, or Firm*—Ostrolenk, Faber, Gerb & Soffen, LLP

[57] ABSTRACT

As for wireless communication lines between a master station and a plurality of remote stations, each remote station has a function F having an unitary variable which is known over all the stations and has two unique IDs, respectively. The master station is provided with a remote station ID memory circuit which outputs one ID of a remote station when the other ID of the remote station is input thereto, and a scrambler. carries out scrambling by using a fixed scramble vector VO during a setup sequence period and using a scramble vector VF set from a master station control circuit at the time of data transmission. A descrambler descrambles an input signal from the remote station by using the scramble vector VO during the setup sequence period and using a scramble vector VR set from the master station control circuit at the time of data transmission.

8 Claims, 5 Drawing Sheets

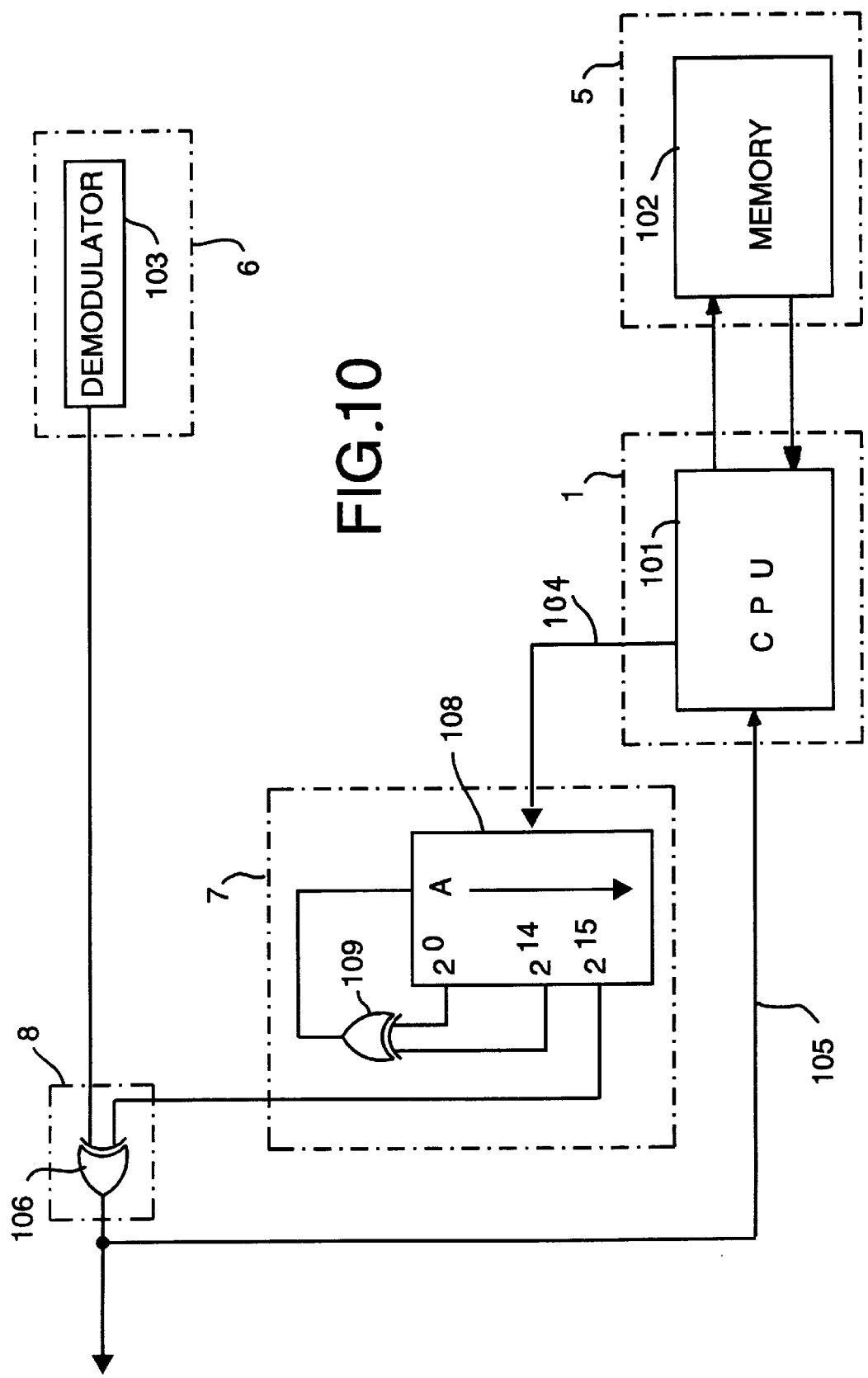

SCRAMBLE WIRELESS COMMUNICATION SYSTEM

This is a Continuation of application Ser. No. 08/438,693, filed on May 11, 1995, abandoned.

BACKGROUND OF THE INVENTION

1. Field of the Invention

The present invention relates to a digital wireless communication system for transmitting data between a plurality of remote stations and a master station in the wireless communication, and more particularly to a scramble wireless communication system having a scrambling function for maintaining a privacy of data in wireless communication lines.

2. Description of the Related Art

Data have been conventionally transmitted between a master station and a plurality of remote stations by using wireless communication lines.

FIG. 1 is a view showing an example of a network structure adopting such a conventional scramble communication system, In the drawing, data have been transmitted between a master station (MS) 60 and N (an integer equal to or above one) remote stations (RS) $50_1$ to $50_N$ in a communication system using TDMA (Time Domain Multiple Access) or SCPC (Single Channel Per Carrier) method.

Since an outsider can relatively easily intercept data transmitted on such a wireless communication line, there is employed a privacy function by which the data currently transmitted on the wireless communication line are scrambled as a countermeasure for avoiding the interception.

The description will be given as to a first example of the prior art in which such a scramble process is carried out with respect to the wireless communication line for data transmission with reference to FIG. 2 and 3.

FIG. 2 is a block diagram showing a construction of the master station 60. In the drawing, the master station 60 is constituted by: a switch circuit 22 which receives a data signal (a data signal in the form of, e.g., voice or facsimile) input from a terminal and an information signal (which is referred to as Signal Unit and abbreviated as SU hereinbelow) from a master station control circuit (MASTER CONT) 21 and switches between these signal using a control signal from the MASTER CONT 21; a scrambler 23 which receives output data from the switch circuit 22 and a scramble vector from the MASTER CONT 21 as an initial value of pseudo-random noise pattern (PN pattern) and generates a random pattern to perform scrambling; a transmitter 24 which receives an output from the scrambler 23 and carries out a predetermined digital modulation to transmit data to a remote station by using a predetermined radio frequency; a receiver 25 which receives a transmitted signal scrambled at each of the remote stations $50_1$ to $5_N$ and demodulates a data signal transmitted from the remote station; a descrambler 26 which performs descrambling by receiving demodulated output data which has been scrambled from the receiver 25 and generating the same PN pattern with that of the scrambler 23 and restores the original data; and a switch circuit (SWITCH) 27 which switches between the MASTER CONT 21 and an external terminal to which an output from the descrambler 26 is supplied in accordance with a control signal from the MASTER CONT 21.

On the other hand, FIG. 3 illustrates a structure of one station arbitrarily selected from the remote stations $50_1$ to $50_N$. As similar to the master station 50, a master station 60 receives a transmitted signal which is obtained by scrambling a data signal input from a terminal through a switch circuit 29, a scrambler 30 and a transmitter 31.

A scramble signal transmitted from the master station 60 is externally output as output data through a receiver 32, a descrambler 33 and a switch circuit 34 or output to a remote station control circuit 28.

When carrying out the communication between the master station 60 and the remote stations $50_1$ to $50_N$, there is always provided a setup sequence period before transmitting and/or receiving the actual communication data and the information required for the communication (for example, the information of such as radio frequency used in the actual communication) is transmitted between the master station 60 and a remote station $50_k$ (k is a positive integer arbitrarily selected from 1 to N) at which the communication is desired. The scrambling is not carried out during the setup sequence period in order to simplify the sequence procedure and obtain a reliable communication.

In the master station 60, therefore, the SWITCH 22 performs switching in accordance with the control signal from the MASTER CONT 21 to supply the SU signal to the scrambler 23 during the setup sequence period. The scramble vector which is a parameter for determining an initial value of the scrambler 23 during the setup sequence period is a fixed value (referred to as VO) and the scramble vector of the descrambler 26 is always a VO.

An output signal from the descrambler 26 is switched to the SU side by means of the SWITCH 27 and fed to the MASTER CONT 21.

In addition, as to the remote station $50_k$, the REMOTE CONT 28 switches the SWITCH 29 to the SU side and the SU transmitted from the master station is supplied to the scrambler 30. The scramble vector of the scrambler 30 is the VO which constantly gives a fixed value and an output signal from the scrambler 30 is sent to the transmitter 31.

On the receiving side, the scramble vector of the descrambler 33 is the VO and the SWITCH 34 is changed over to the SU side to supply the SU to the REMOTE CONT 28.

The setup operation between the master station 60 and the remote station $50_k$ is carried out with the above-described settings.

Subsequently, the remote station $50_k$ randomly generates at the REMOTE CONT 28 a value of the scramble vector (referred to as VF) which is used in the actual communication and transmits the determined value to the master station 60 by using the SU, Upon receiving a value of the scramble vector VF transmitted by the remote station $50_k$, the master station 60 stores this value in the MASTER CONT 21 and determines a value of the scramble vector VF of the scrambler 23 by using the received value. As a result, the scramble vectors which are the same in transmission and reception are obtained, thus enabling the transmitting/receiving processes. That is, the remote station $50_k$ determines the scramble vector of the descrambler 33 as the VF, and the master station 60 sets the scramble vector of the scrambler 23 as the VF when the SU including the VF is input to the MASTER CONT 21.

Consequently, the data VO having a fixed value are always used as the scra mble vector when transmitting from the remote stations $50_1$ to $50_N$ to the master station 60 in the data communication after the setup sequence period is completed, while the scramble vector VF randomly generated in the remote stations $50_1$ to $50_k$ is used when transmitting from the master station 60 to the remote stations $50_1$ to $50_k$.

The scramble processing is fixedly carried out when transmitting from the remote stations to the master station while the scramble processing is randomly performed when transmitting from the master station to the remote stations. That is because the structure of the master station which is complicated as compared with those of the remote stations and the enlarged dimension of the antenna lead to the low possibility of interception on the wireless. communication lines between when transmitting from the remote s ations to the master station, thereby lowering the necessity for the scramble processing. Further, since the simplification in the network structure and the improvement of reliability are also intended, these two types of scramble processing are performed.

FIG. 4 shows the flow of signal processing between the remote station $50_k$ and the master station 60 described above. In the drawing, the scramble vector is set as the VO between the remote station $50_k$ and the master station during the setup sequence period, and thereafter the scramble vector VF is transmitted from the remote station $50_k$ to the master station 60. Both the vectors are transmitted by the scramble vector VF in the communication period. In FIG. 4, the fact that the signal transmitted from the remote station $50_k$ to the master station 60 is represented as the SU (VO) means that the SU signal is transmitted with the scramble ector which is the VO. The same representation is used hereinbelow. The scramble vector VF is randomly generated from the ma ter station to the remote station in the prior art structure described above. The parameter value of this scramble vector VF is transmitted from the remote station to the master station during the setup sequence and the actual communication periods, but alternatively the scramble vector and the communication data may be subjected to the frequency division to be transmitted.

FIG. 5 is a block diagram showing a remote station used in such a second example of the prior art.

In this example, it is basically assumed that the transmission is carried out between remote stations (the master station may be included therebetween).

In the drawing, a scramble vector V randomly generated by each remote station at a remote station control circuit (REMOTE CONT) 35 is set in a scrambler 36 and input data (for example, data of such as voice or facsimile) is scrambled. The scramble vector used here is encoded into a VZ by an encoder circuit 39 and input to a multiplexer circuit 37.

The multiplexer circuit 37 subjects the input data and the scramble vector to the frequency multiplexing in the different frequency bands and transmits them by a transmitter circuit 38.

In the receiving portion, a signal received by a receiver circuit 40 is separated from a main sound signal and an encoded signal VZ of the scramble vector by means of a separator circuit 41, and the main sound signal is input to a descrambler 42 while the encoded signal VZ is decoded into the scramble vector V set on the transmitter side by a decoder circuit 43 to be supplied to the remote station control circuit 35 and the descrambler 42. The descrambler 42 performs descrambling by using this scramble vector V and outputs a sound signal. Such a scrambling method is disclosed in, for example, Japanese patent laid-open publication No. Hei 4-192638, 1992.

In the configuration of the above-described prior art, the scramble vector transmitted from the master station to the remote stations is randomly generated for each communication in the first example, but the scramble vector transmitted from the remote stations to the master station is always the same even when the remote station with which the master station communicates varies, and hence there occurs such a problem that the scramble vector can be decoded by intercepting the communication from every remote station.

Further, although the scramble vector which is random in the bidirectional manner can be used when communicating between remote stations as described in the above second example, the transmission frequencies having multi-value parameters are excessively used outside the band, thus reducing the frequency efficiency in all the communication lines.

SUMMARY OF THE INVENTION

In view of above-stated drawbacks, it is therefore an object of the present invention to enable that each remote station can use its own scramble vector in the bidirectional communication between two remote stations without lowering the frequency efficiency of the communication lines when performing scrambling between a master station and remote stations, thereby improving the privacy.

According to one aspect of the present invention, there is provided a scramble wireless communication system in which a setup sequence period is provided for supplying and/or receiving SUs when communicating between a master station and remote stations, each station is provided with a function F having an unitary variable which is known over all the stations and each remote station has its own two identification codes (which are referred to as IDs hereinbelow), the master station comprising: a remote station ID memory circuit which stores each ID of all the remote stations and outputs one ID of one remote station upon receiving the other ID of the remote station; a control circuit which performs generation/decoding and transmission/reception of an SU used in the setup sequence period, generates a scramble vector VF from one ID transmitted from a remote station through an SU by using the function F to set the VF in a scrambler, outputs the ID from the remote station to the remote station ID memory circuit, receives the ID from the remote station memory circuit, and sets a scramble vector VR from the function F with the ID as a variable in a descrambler; a scrambler which scrambles an input signal by using a fixed scramble vector VO during the setup sequence period and using the scramble vector VF set by the control circuit at the time of audio/facsimile communication; and a descrambler which descrambles a signal transmitted from a remote station by using the scramble vector VO during the setup sequence period and using the scramble vector VR set by the control circuit at the time of audio/facsimile communication.

According to another aspect of the present invention, a remote station comprises: a remote station control circuit which performs generation/decoding and transmission/reception of an SU, transmits one of two IDs inherent to each remote station which are previously stored to a master station through the SU, generates a scramble vector VF from a function F with the ID as a variable to set the VF in a descrambler, and generates a scramble vector VR from the function F with the other ID as a variable to set the VR in the scrambler; a scrambler which scrambles an input signal by using a fixed scramble vector VO during the setup sequence period and by using the scramble vector VR set from the remote station control circuit at the time of audio/facsimile communication; and a descrambler which descrambles a signal transmitted from a master station by using the scramble vector VO during the setup sequence period and using the scramble vector VF set from the remote station control circuit at the time of audio/facsimile communication.

BRIEF DESCRIPTION OF THE DRAWINGS

Above-mentioned and other features and objects of this invention will become more apparent with reference to the accompanying drawings, in which:

FIG. 10 is a block diagram showing a descramble processing for the master station according to the present invention.

DESCRIPTION OF THE PREFERRED EMBODIMENT

An embodiment according to the present invention will be described in connection with the drawings.

Figure 7:
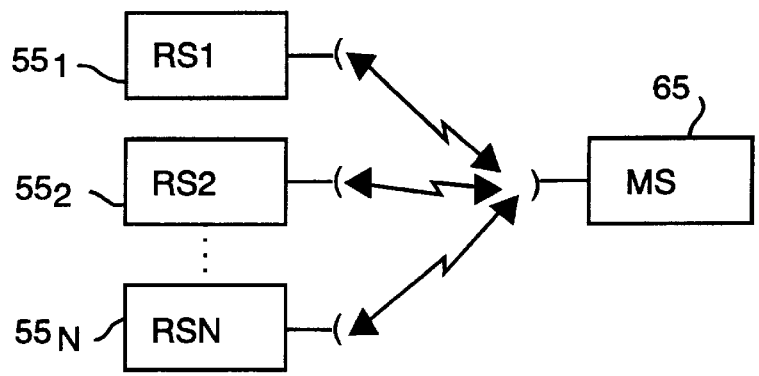
FIG. 7 is a block diagram showing a network structure to which an embodiment according to the present invention is applied.

As shown in FIG. 7, the privacy of data is maintained by scrambling on wireless communication lines between a plurality of remote stations $50_1$ to $50_N$ and a master station 65 in the present invention. In this system, however, it is assumed that each of remote stations $50_1$ to $50_N$ has its own multiple IDs (identification numbers), the master station 65 and the remote stations $50_1$ to $50_N$ have a common function F including an unitary variable, and this function is known over all the stations.

Figure 8:
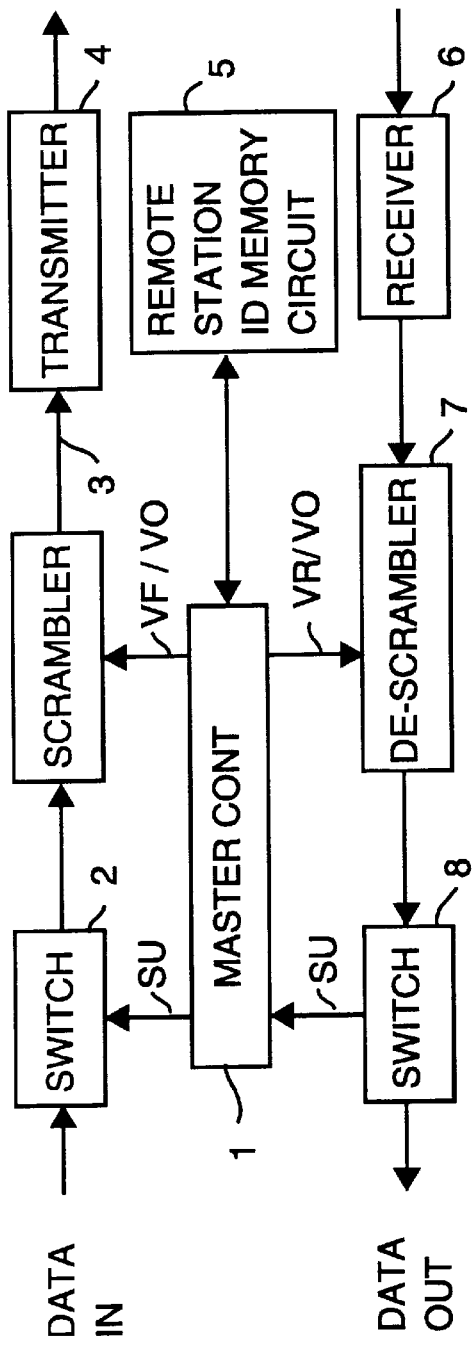
FIG. 8 is a block diagram showing a structure of a master station in the embodiment according to the present invention.

FIG. 8 is a block diagram showing a primary structure of the master station 65 used in the present invention.

Figure 9:
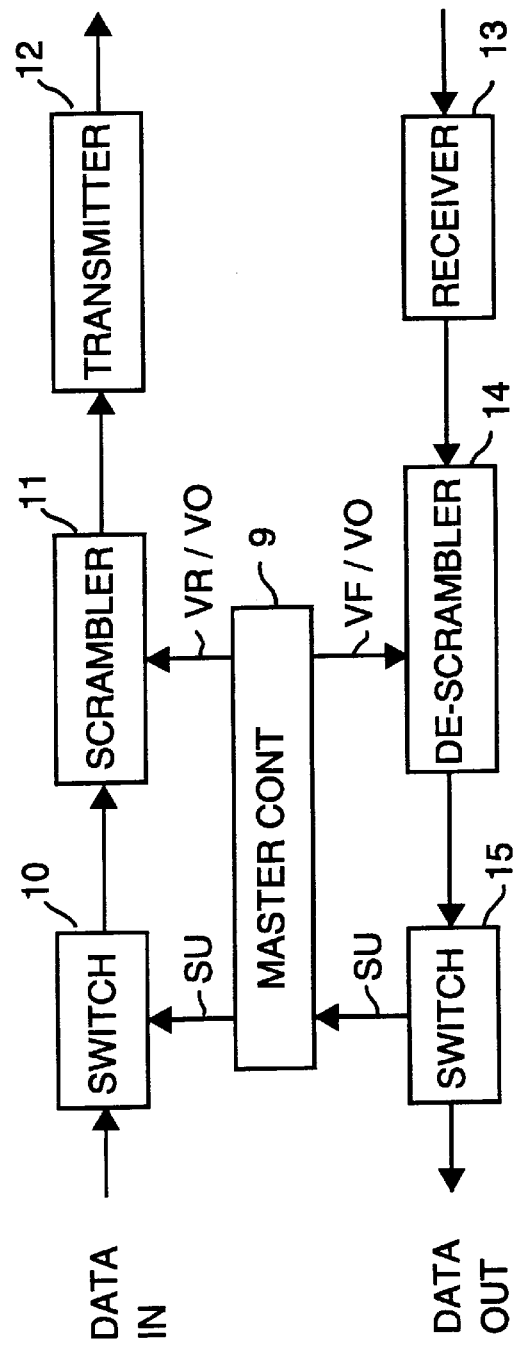
FIG. 9 is a block diagram showing a structure of a remote station in the embodiment according to the present invention.

Further, FIG. 9 is a block diagram showing a primary structure of one remote station $50_k$ arbitrarily selected from the remote station $50_1$ to $50_N$ used in the present invention.

Figure 1:
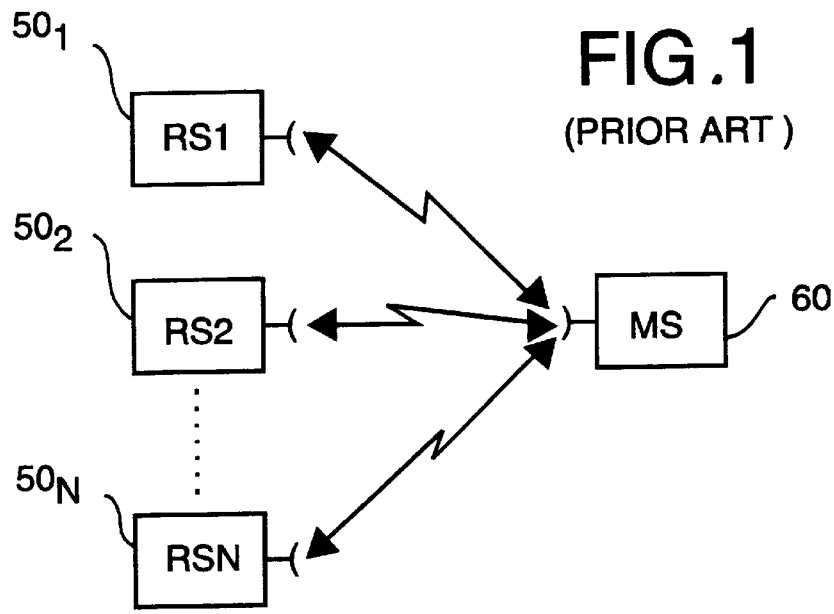
FIG. 1 is a block diagram of a network structure constituted by a master station and a plurality of remote stations to which conventional examples are applied.
Figure 4:
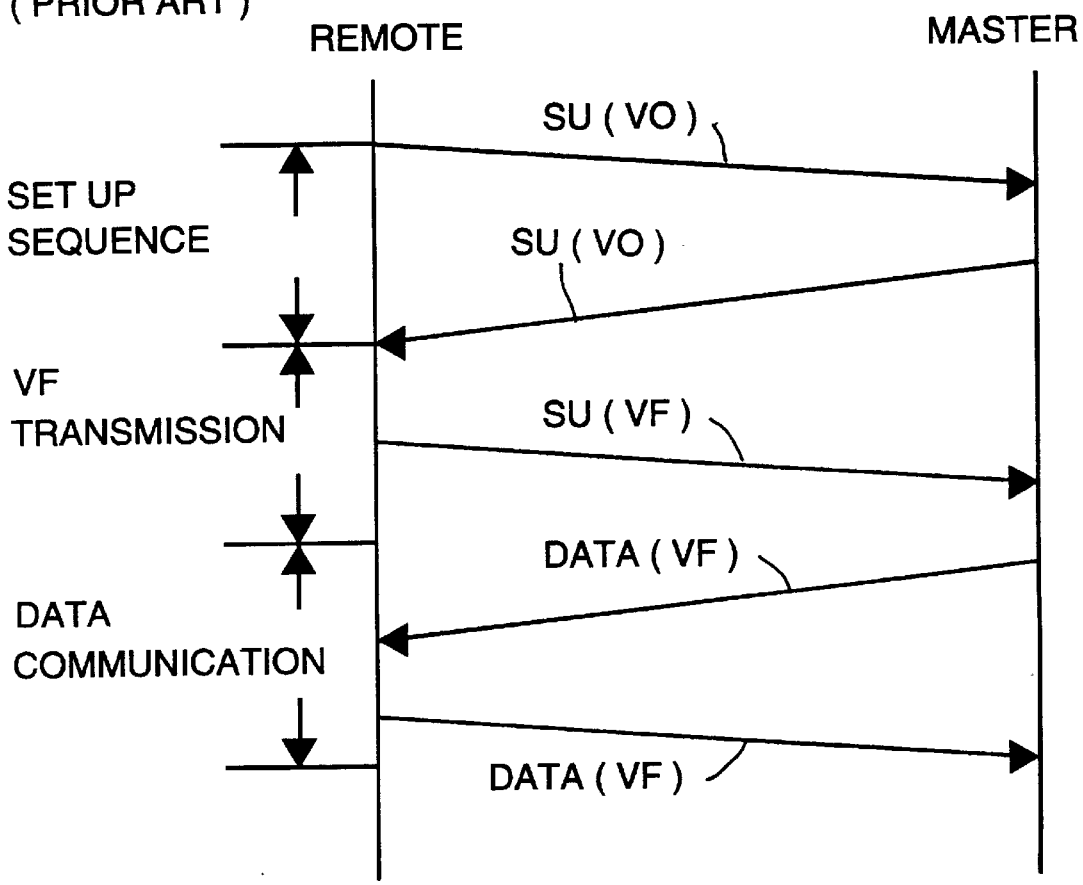
FIG. 4 is a sequence diagram of a signal transmission between a master station and a remote station in the first conventional example.
Figure 2:
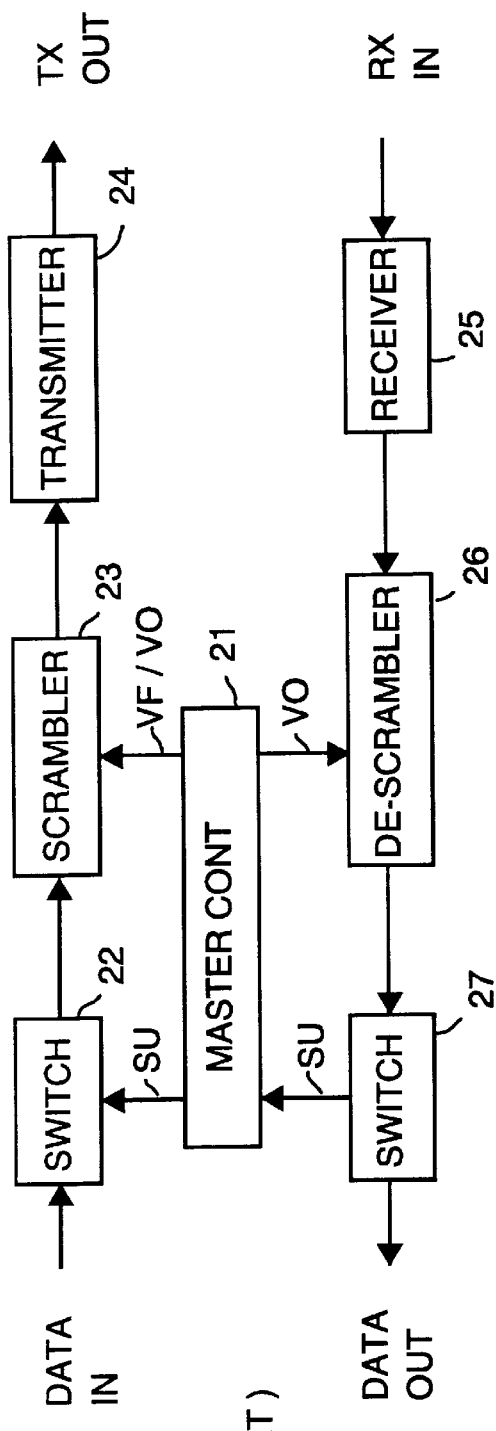
FIG. 2 is a block diagram of a structure of a master station in a first conventional example.
Figure 3:
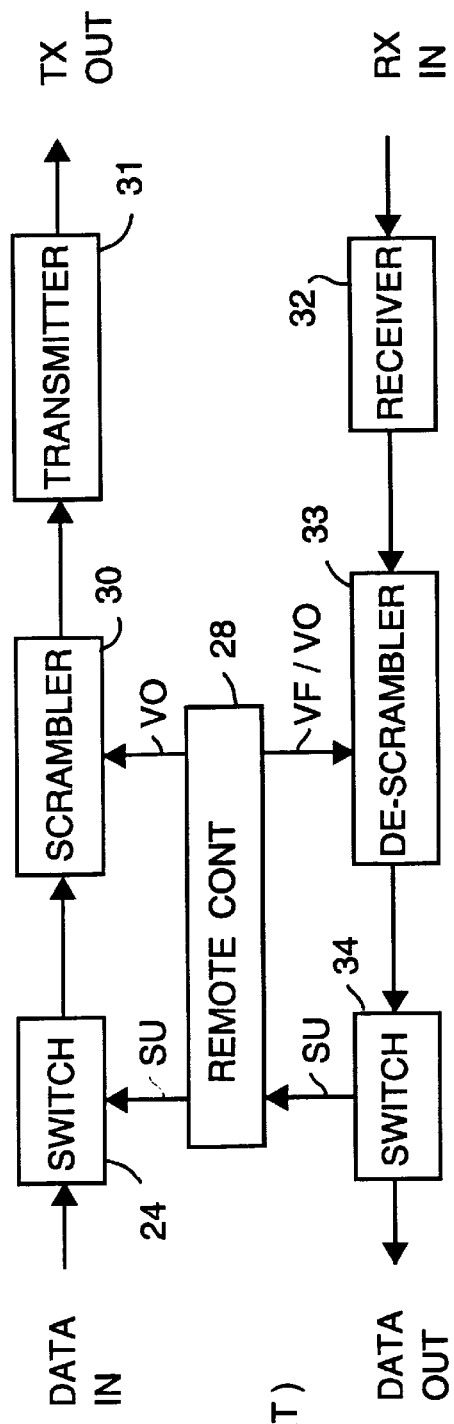
FIG. 3 is a block diagram of a structure of a remote station in the first conventional example.
Figure 5:
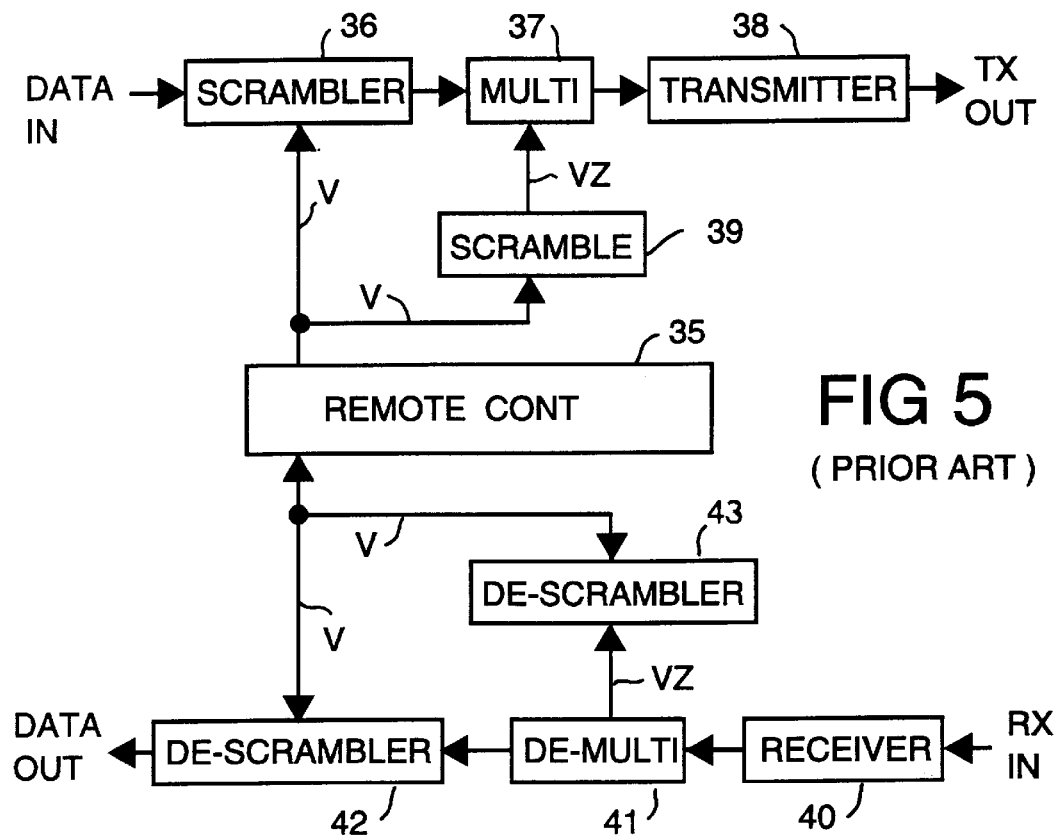
FIG. 5 is a block diagram of a structure of a remote station in a second conventional example.
Figure 6:
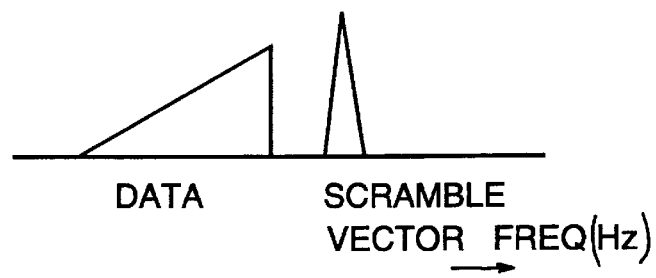
FIG. 6 is a view showing a frequency spectrum in the second conventional example.

As similar to the first conventional example shown in FIG. 4, there is provided a setup sequence period before the actual communication in this embodiment, and an information packet transmitted/received during the setup sequence period is referred to as an SU. In addition, scramble vectors of a scrambler 3 and a descrambler 7 of the master station 65 and of a scrambler 11 and a descrambler 14 of the remote station $50_k$ used in a bidirectional communication during the setup sequence period are so controlled by the MASTER CONT 1 and the REMOTE CONT 9 as to constantly become fixed VOs.

Referring to FIG. 8, the SU is input from the control circuit 1 to the scrambler 3 through the switch circuit 2 in the master station 65. The scrambler 3 carries out scrambling by using the scramble vector VO output from the master station control circuit 1, and the SU is modulated in the transmitter circuit 4 to be fed to the remote station $50_k$.

On the other hand, as shown in FIG. 9, the received SU is demodulated by the receiver circuit 13 and descrambled by the descrambler 14 in the remote station $50_k$. The SU fed from the master station is further supplied to the remote station control circuit 9 through the switch circuit 15. The same operation is performed by using the SU when carrying out the transmission from the remote station $50_k$ to the master station 65 via the switch circuit 10, the scrambler 11 and the transmitter circuit 12, but in such a case, the remote station control circuit 9 selects one out of two unique IDs of each remote station which are previously stored during the setup sequence period. The selected ID is transmitted from the remote station $50_k$ to the master station by using the SU, and at the same time, one scramble vector VF is produced from the above-mentioned function F with this ID as a variable and set in the descrambler 14. Further, another scramble vector VR is generated from the function F with the other ID as a variable and set in the scrambler 11. Thereafter, the VF is used in the remote station $50_k$ as a scramble vector when communicating from the master station 65 to the remote station $50_k$ while the VR is similarly used when communicating from the remote station $50_k$ to the master station 65. Here, the function F gives a fixed relational expression between a received ID and a random scramble vector VF or VR. For example, it is assumed that the remote station $50_k$ has two IDs, i.e., $ID_1$=[011] and $ID_2$=[101] and C=[111] is provided. Further, it is assumed that the function F equals to $F(ID)=ID_K \int C$. Then, expressions, i.e., $VF=F(ID_1)=ID_1 \oplus C=[100]$ and $VR=F(ID_2) =ID_2 \oplus C=[010]$ can be obtained when transmitting $ID_1$= [011] to the master station.

When the control circuit 1 receives the SU including the ID of the remote station $50_k$ through the receiver circuit 6, the descrambler 7 and the switch circuit 8 in the master station 65, the control circuit 1 outputs the ID to the remote station ID memory circuit 5 storing respective IDs of all the remote stations, and at the same time, the scramble vector VF is generated from the function F with this ID as a variable and set in the scrambler 3. The remote station ID memory circuit 5 identifies the other ID of the remote station currently performing communication from this ID and outputs the identified ID to the control circuit 1. The control circuit 1 produces the scramble vector VR from the function F with the received ID as a variable and set it in the descrambler 7.

FIG. 10 is an illustration of the embodied structure showing the descramble processing for the master station 65 according to the present invention. Here, the demodulated output from the demodulator circuit 103 in the receiver circuit 6 is input to an exclusive OR circuit 106 corresponding to the switch circuit 8. Further, an output signal 105 from the exclusive OR circuit 106 corresponds to the SU and is supplied to a CPU 101 for the master station control circuit 1.

The CPU 101 is connected with the memory 102 for storing the IDs of the remote stations.

Moreover, an output signal 104 from the CPU 101 outputs a scramble vector, and this signal is input as an initial value of a shift register 108 for generating PN patterns.

An output signal from the shift register 108 for generating PN patterns is input to the exclusive OR circuit 106.

In this way, when setting of the scramble vectors VF and VR is completed in the master station and the remote station, the VF is used when communicating from the master station to the remote station while the VR is used when communicating from the remote station to the master station in the case of the actual audio/facsimile communication.

According to this system, since the scramble vector used in the audio/facsimile communication after the setup sequence period is generated from the function with the identification code that each remote station uniquely has as a variable, the unique scramble vector can be used when communicating from the master station to the remote station and vice versa without the need of excessive frequencies as in the conventional system, thus improving the privacy.

While the invention has been described with reference to an illustrative embodiment, this description is not intended to be construed in a limiting sense. Various other embodiments of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A scramble wireless communications system which has a scrambler in each station on a transmitter side and a descrambler in each station on a receiver side in order to maintain privacy of data on wireless communication lines between a master station and a plurality of remote stations, said system comprising:

a remote station among a plurality of said remote stations which starts communication with said master station comprising:

a selecting means for selecting either of unique first and second identification codes, a first scramble code determining means which determines a scramble code of said scrambler of said remote station using a predetermined unitary function with said first identification code selected by said selecting means and determines a descramble code of said descrambler of said remote station using said predetermined unitary function with said second identification code selected by said selecting means, and a transmitting means for transmitting said selected identification code to said master station; and said master station comprising:

a second scramble code determining means for determining scramble codes of said scrambler and said descrambler of said master station which restore the scramble codes of said scrambler and said descrambler of said master station on the basis of said first identification code received from said remote station by using said predetermined unitary function in accordance with all the previously stored unique first and second identification codes of a plurality of said remote stations.

2. A scramble wireless communication system as set forth in claim 1, wherein said first and second scramble code determining means determine scramble codes on the basis of a value of a scramble vector for determining an initial value of a pseudorandom noise (PN) pattern generator.

3. A scramble wireless communication system as set forth in claim 1, wherein said predetermined unitary function is used for converting said first or second identification code into said scramble vector by generating a bit string using a fixed relational expression.

4. A scramble wireless communication system as set forth in claim 1, wherein the scramble wireless communication is carried out during a setup sequence period in which information required for said communication is transmitted and/or received before the data communication between said master station and said remote station.

5. A scramble wireless communication system as set forth in claim 4, wherein said scrambler and said descrambler of each of said master station and said remote station perform transmission by using a predetermined fixed scramble code during said setup sequence period.

6. A scramble wireless communication systems as set forth in claim 1, wherein said scramble vectors obtained by said first and second scramble code determining means are set to said scrambler and said descrambler to carry out scrambling in the actual data communication after said setup sequence period.

7. A scramble wireless communication system which performs a setup sequence processing for transmitting and/or receiving information (referred to as an SU hereinbelow) required for the communication and has each remote station having unique two identification codes (referred to as IDs hereinbelow) when communicating between a master station and a remote station, said system characterized by that:

said master station comprises a remote station ID memory circuit which stores each ID of all the remote stations and outputs one ID of any remote station when the other ID of the remote station is input thereto;

a control circuit which performs generation/decoding and transmission/reception of the SU used during a setup sequence period, produces a scramble vector VF by using a function F from one ID supplied from a remote station through the SU to set the VF in a scrambler, outputs the ID from the remote station to a remote station ID memory circuit, receives the other ID from the remote station ID memory, and set a scramble vector VR from the function F with the received ID as a variable to set the VR in a descrambler;

a scrambler for scrambling an input signal by using a fixed scramble vector VO during the setup sequence period and using the scramble vector VF set from the control circuit during data communication period; and a descrambler for descrambling a signal supplied from a remote station by using the scramble vector VO during the setup sequence period and using the scramble vector VR set from the control circuit during data communication period.

8. A scramble wireless communication system as set forth in claim 7, wherein said remote station comprises a control circuit which performs generation/decoding and transmission/reception of the SU, produces a scramble vector VF by using said function F from one ID stored predetermindedly and sets said VF in a descramler, and produces said scramble vector VR by using said function from the other ID stored predetermindedly and sets said VR in a scrambler;

a scrambler for scrambling an input signal by using said fixed scramble vector VO during the setup sequence period and using the scramble vector VR set from said control circuit during the data communication period;

a descrambler for descrambling a signal supplied from said master station by using the scrambler vector VO during said setup sequence period and using the scrambler vector VF set from said cotrol circuit during the data communication period.

* * * * *